United States Patent
Bartholomew et al.

(10) Patent No.: US 9,334,173 B2
(45) Date of Patent: May 10, 2016

(54) METHOD FOR MAKING HIGHLY POROUS, STABLE METAL OXIDES WITH A CONTROLLED PORE STRUCTURE

(75) Inventors: Calvin H. Bartholomew, Orem, UT (US); Brian F. Woodfield, Provo, UT (US); Baiyu Huang, Orem, UT (US); Rebecca Elizabeth Olsen, Murray, UT (US); Lynn Astle, Provo, UT (US)

(73) Assignee: Brigham Young University, Provo, UT (US)

( * ) Notice: Subject to any disclaimer, the term of this patent is extended or adjusted under 35 U.S.C. 154(b) by 1117 days.

(21) Appl. No.: 13/069,317

(22) Filed: Mar. 22, 2011

(65) Prior Publication Data

US 2011/0257008 A1    Oct. 20, 2011

Related U.S. Application Data

(60) Provisional application No. 61/340,762, filed on Mar. 22, 2010.

(51) Int. Cl.
| | | |
|---|---|---|
| C01B 13/18 | (2006.01) | |
| B01J 20/30 | (2006.01) | |
| B01J 32/00 | (2006.01) | |
| C01F 7/34 | (2006.01) | |
| C01B 13/36 | (2006.01) | |
| C01G 25/02 | (2006.01) | |

(52) U.S. Cl.
CPC . *C01F 7/34* (2013.01); *C01B 13/36* (2013.01); *C01B 13/363* (2013.01); *C01G 25/02* (2013.01); *C01P 2002/60* (2013.01); *C01P 2002/72* (2013.01); *C01P 2004/52* (2013.01); *C01P 2006/12* (2013.01); *C01P 2006/13* (2013.01); *C01P 2006/14* (2013.01); *C01P 2006/16* (2013.01)

(58) Field of Classification Search
CPC .................................................. C01B 13/36
See application file for complete search history.

(56) References Cited

U.S. PATENT DOCUMENTS

| | | | |
|---|---|---|---|
| 2,457,719 A | 12/1948 | Pine et al. | |
| 2,767,202 A | 10/1956 | Rottig | |
| 2,786,817 A | 3/1957 | Rottig | |
| 3,260,679 A | 7/1966 | Wennerberg et al. | |
| 3,271,324 A | 9/1966 | Hirschler et al. | |
| 3,941,719 A | 3/1976 | Yoldas | |
| 3,944,658 A | 3/1976 | Yoldas | |
| 4,275,052 A | 6/1981 | Ryu | |
| 4,422,960 A * | 12/1983 | Shiroto et al. | 502/206 |
| 4,532,072 A | 7/1985 | Segal | |
| 4,543,341 A | 9/1985 | Barringer et al. | |
| 4,622,308 A | 11/1986 | Koikeda et al. | |
| 4,622,311 A * | 11/1986 | Wakui et al. | 502/235 |
| 5,227,407 A | 7/1993 | Kim | |
| 5,328,501 A | 7/1994 | McCormick et al. | |
| 5,397,758 A | 3/1995 | Bouruetaubertot et al. | |
| 5,455,019 A | 10/1995 | Inui et al. | |
| 5,698,483 A | 12/1997 | Ong et al. | |
| 6,066,305 A | 5/2000 | Dugger | |
| 6,203,768 B1 | 3/2001 | McCormick et al. | |
| 6,503,475 B1 | 1/2003 | McCormick et al. | |
| 6,558,847 B1 | 5/2003 | Kawakami et al. | |
| 6,558,884 B1 | 5/2003 | Greener et al. | |
| 6,660,897 B1 | 12/2003 | Marchal-George et al. | |
| 7,071,239 B2 | 7/2006 | Ortego, Jr. et al. | |
| 7,118,727 B2 | 10/2006 | Williams | |
| 7,125,536 B2 | 10/2006 | Fu et al. | |
| 7,163,963 B2 | 1/2007 | Fraenkel | |
| 7,259,286 B2 | 8/2007 | Jothimurugesan et al. | |
| 7,452,844 B2 | 11/2008 | Hu et al. | |
| 8,211,388 B2 | 7/2012 | Woodfield et al. | |
| 8,216,963 B2 | 7/2012 | Kibby et al. | |
| 8,226,740 B2 | 7/2012 | Chaumonnot et al. | |
| 8,324,128 B2 | 12/2012 | Rytter et al. | |
| 2002/0028745 A1 | 3/2002 | Krylova et al. | |
| 2003/0032192 A1 | 2/2003 | Haubold et al. | |
| 2003/0180213 A1 | 9/2003 | Carnes et al. | |
| 2004/0122115 A1 | 6/2004 | Espinoza et al. | |
| 2005/0031517 A1 | 2/2005 | Chan | |
| 2005/0260122 A1 | 11/2005 | Li et al. | |
| 2006/0115411 A1 | 6/2006 | Jensen et al. | |
| 2008/0032132 A1* | 2/2008 | Woodfield et al. | 428/402 |
| 2009/0023581 A1* | 1/2009 | Di Monte et al. | 502/263 |
| 2009/0036558 A1* | 2/2009 | Font Freide et al. | 518/715 |
| 2010/0174002 A1 | 7/2010 | Kibby et al. | |
| 2011/0257008 A1 | 10/2011 | Bartholomew et al. | |
| 2012/0122671 A1 | 5/2012 | Polli et al. | |
| 2013/0184360 A1 | 7/2013 | Eri et al. | |

FOREIGN PATENT DOCUMENTS

| | | |
|---|---|---|
| CN | 1184703 | 6/1998 |
| CN | 1477059 | 2/2004 |

(Continued)

OTHER PUBLICATIONS

The influence of cation, anion and water content on the rate of formation and pore size distribution of zeolite ZSM-5 L. Petrik South African Journal of Science, vol. 105, pp. 251-257, 2009.*

(Continued)

*Primary Examiner* — Melvin C Mayes
*Assistant Examiner* — Douglas Call
(74) *Attorney, Agent, or Firm* — Workman Nydegger

(57) ABSTRACT

Methods for making high-surface area, high-porosity, stable metal oxides, such as, but not limited to materials used as adsorbents and catalyst supports include (i) forming a solvent deficient precursor mixture from a metal salt and a base and reacting the metal ions and base ions in the solvent deficient precursor mixture to form an intermediate hydroxide product (e.g., metal hydroxide or metal oxide hydroxide), (ii) causing the intermediate hydroxide to form nanoparticles (e.g., by heating), and (iii) calcining the intermediate nanoparticles to sinter the nanoparticles together and yield a highly porous, stable metal oxide aggregate having a pore structure.

8 Claims, 3 Drawing Sheets

(56) References Cited

FOREIGN PATENT DOCUMENTS

| CN | 1986409 | 6/2007 |
| --- | --- | --- |
| CN | 101384511 | 3/2009 |
| JP | 2009-527365 | 7/2009 |
| WO | 2006/070203 | 7/2006 |
| WO | WO 2007/098111 | 8/2007 |
| WO | 2009/061707 | 5/2009 |

OTHER PUBLICATIONS

U.S. Appl. No. 11/707,840, filed Feb. 16, 2007, Brian F. Woodfield et al.
U.S. Appl. No. 13/836,850, filed Mar. 15, 2013, Brian F. Woodfield et al.
U.S. Appl. No. 13/836,985, filed Mar. 15, 2013, Brian F. Woodfield et al.
Meulenkamp, E. A., Synthesis and growth of ZnO nanoparticles, Journal of Physical Chemistry B, Jul. 16, 1998, pp. 5566-5572. vol. 102, No. 29, ACS, USA.
Niederberger, M. et al, Non-aqueous routes to crystalline metal oxides nanoparticles: Formation mechanisms and applications, Progress Solid State Chemistry, 2005, pp. 59-70, vol. 33, No. 2-4, Elsevier, UK.
Li, Feng et al., One-step solid-state reaction synthesis and gas sensing property of tin oxide nanoparticles, Sensors and Actuators B, Jan. 5, 2005, pp. 165-169, vol. 81, No. 2-3, Elsevier Sequoia S.A., Lausanne, CH.
Morales, J. et al., Synthesis and characterization of nanometric iron and iron—titanium oxides by mechanical milling: electrochemical properties as anodic materials in lithium cells, Journal of Electrochemical Society, Sep. 2005, pp. A1748-A1754, vol. 152, No. 9, Electrochem. Soc, USA.
Tsuzuki, Takuya et al., ZnO NAnoparticles Synthesised by Mechanochemical Process, Scripta Materialia, 2001, pp. 1731-1734, vol. 44, Nos. 8/9.
Wostek-Wojiciechowska, Dorota, et al., The solid-state synthesis of metal nanoparticles from organometallic precursors, Journal of Colloid and Interface Science, Jul. 1, 2005, pp. 107-113, vol. 287, No. 1, Academic Press, New York, NY, USA.
Zhijian, Wang, et al, Low-temperature synthesis of ZnO nanoparticles by solid-stae pyrolytic reaction, Nanotechnology, Jan. 1, 2003, pp. 11-15, vol. 14, No. 1,10P, Bristol, GB.
U.S. Appl. No. 11/707,840, Nov. 27, 2009, Restriction Requirement.
U.S. Appl. No. 11/707,840, Apr. 1, 2010, Office Action.
U.S. Appl. No. 11/707,840, Oct. 14, 2010, Final Office Action.
U.S. Appl. No. 11/707,840, Jan. 27, 2011, Interview Summary.
U.S. Appl. No. 11/707,840, Jan. 27, 2011, Advisory Action.
U.S. Appl. No. 11/707,840, May 24, 2011, Office Action.
U.S. Appl. No. 11/707,840, Dec. 28, 2011, Final Office Action.
U.S. Appl. No. 11/707,840, Mar. 8, 2012, Notice of Allowance.
U.S. Appl. No. 14/201,538, filed Mar. 7, 2014, Maryam Khosravi-Mardkhe et al.
U.S. Appl. No. 13/836,850, Jun. 9, 2014, Office Action.
U.S. Appl. No. 13/836,985, Jul. 1, 2014, Office Action.
U.S. Appl. No. 13/836,850, Oct. 24, 2014, Final Office Action.
U.S. Appl. No. 13/836,985, Dec. 3, 2014, Final Office Action.
U.S. Appl. No. 13/836,850, Dec. 22, 2014, Notice of Allowance.
U.S. Appl. No. 13/836,985, Mar. 5, 2015, Notice of Allowance.
Orefice, et al. Sol-Gel Transition and Structional Evolution on Multicomponent Gels Derived from the Alumina-Silica System, Jul. 1996, Journal of Sol-Gel Science and Technology, 9, 239-249.
Wu W et al. "Preparation of nanocrystalline zinc carbonate and zinc oxide via solid-state reaction at room temperature," Materials Letters, North Holland Publishing Company, Amsterdam, NL, vol. 60, No. 21-22, Sep. 1, 2006, pp. 2791-2794.
Supplemental European Search Report from Application No. EP 11760091 dated May 6, 2015.
U.S. Appl. No. 14/201,538, Apr. 9, 2015, Office Action.
U.S. Appl. No. 13/836,850, Apr. 17, 2015, Notice of Allowance.

\* cited by examiner

METHOD FOR MAKING HIGHLY POROUS, STABLE METAL OXIDES WITH A CONTROLLED PORE STRUCTURE

CROSS-REFERENCE TO RELATED APPLICATIONS

This Application claims the benefit of U.S. Provisional Patent Application Ser. No. 61/340,762, filed Mar. 22, 2010, titled "Method of producing highly porous, stable metal oxide ceramic materials," which is hereby incorporated herein by reference in its entirety.

GOVERNMENT RIGHTS

This invention was made with government support under STTR Phase II grant No. IIP-0956628 awarded by the National Science Foundation. The government has certain rights in the invention.

BACKGROUND OF THE INVENTION

1. The Field of the Invention

The present invention relates to methods for making high surface area solid catalyst supports and adsorbants having a controlled pore structure.

2. The Relevant Technology

Porous, high surface area metal oxides are used in many applications including thin film semiconductors, solar panels, and as catalyst carriers or "supports" in heterogeneous catalytic systems. Such carriers provide an inexpensive, porous framework for preparation and stabilization of highly-dispersed catalytic phases, i.e., catalytic metals, oxides, or sulfides. The most common catalyst supports consist of the oxides of aluminum, silicon, and titanium. Aluminas (aluminum oxides, $Al_2O_3$) are the most widely used commercial catalyst supports because of their excellent thermal stability and wide range of useful chemical, physical and catalytic properties.

Of the different alumina phases, γ-alumina is most often the preferred structure because of its high thermal stability, relatively high surface area, high mechanical strength, and ability to be formed into extrudates or pellets, as compared to many other types of metal oxide structures. However, the properties of commercially available γ-aluminas are limited. Titanias n both the rutile and anatase crystalline phases also have multiple commercial applications. There is a need for methods that can reliably produce γ-aluminas, titanias and other metal oxides with different pore structures than those currently available and that can do so in an economically feasible way. Published methods for synthesizing mesoporous aluminas and for manufacture of conventional alumina, silica, and titania supports typically involve laborious, multi-step procedures which all involve solution-based methods which add substantially to the cost of such materials. And, each method produces a support material with relatively fixed pore structure characteristics. Examples of various supports and procedures for making supports are disclosed in U.S. Pat. Nos. 2,749,216; 2,796,326; 2,917,366; 3,019,080; 3,038,784; 3,042,696; 3,244,972; 3,419,352; 3,823,895; 3,898,322; 3,941,719; 3,944,658; 3,987,155; 4,154,812; 4,172,809; 4,175,118; 4,275,052; 4,387,085; 4,532,072; 4,579,729; 4,676,928; 5,455,019; 5,480,630; 5,593,654; 5,622,684; 5,863,515; 6,001,326; 6,027,706; 6,129,904; 6,555,496; 6,761,866; 6,764,672; 7,090,824; 7,163,963; 7,235,224; 7,341,976; 7,442,290; 7,534,415; and 7,807,605.

SUMMARY

The present disclosure relates to methods for making high-surface area, high-porosity, stable metal oxides, such as, but not limited to materials used as adsorbents and catalyst supports. The porous materials are made in a three-step process. In a first step, a solvent deficient precursor mixture is formed from a metal salt and a base, and optionally a limited amount of a mixing fluid or reaction fluid. The metal ions and base ions react in the solvent deficient precursor mixture to form an intermediate hydroxide product (e.g., metal hydroxide or metal oxide hydroxide). In a second step the intermediate hydroxide is caused to form nanoparticles (e.g., by heating). In a third step the intermediate nanoparticles are calcined at a higher temperature to sinter the nanoparticles together and yield a highly porous, stable metal oxide aggregate having a pore structure.

The solvent deficient precursor mixture can be made from any number of dry powders, liquids, or fluids so long as the mixed precursor (in which the reaction occurs) is sufficiently deficient in solvent such that the metal ions and base ions are not completely solvated (i.e., the solvation sphere around the ions is limited). For example, where water is the mixing fluid, the metal ions have a hydration sphere that is limited in size as compared to the same ions in an aqueous solution. Limiting the hydration spheres of the ions restricts their interaction and/or movement between and with other components of the reaction mixture. Where a mixing fluid is included in the solvent deficient precursor mixture, such mixtures will typically be a slurry.

Surprisingly it has been found that the use of a solvent deficient reaction mixture during nanoparticle formation allows control over the formation of the pore structure formed in the porous metal oxides (i.e., the aggregated calcined particles). The methods described herein can be used to control the BET surface area, pore size, and/or pore volume of the porous, stable metal oxides being manufactured.

The pore structure of the porous metal oxide can be controlled using various techniques, including, but not limited to, (i) properly selecting the anion of the metal salt, (ii) properly selecting the amount of diluent (i.e., mixing fluid) included in the solvent deficient precursor mixture, (iii) properly adding small amounts of templating agent or non-reacting, non-solvating reagents (e.g., small organic molecules) to the initial reaction mixture, (iv) properly doping the primary metal oxide by the addition of small amounts of one or more different metal salts to the initial reaction mixture, and (v) rinsing the intermediate nanoparticles prior to calcination.

The selection of the anion of the metal salt used in the precursor material has been found to have substantial control over the pore structure. In the solvent deficient environment during the formation and aggregation of the nanoparticles, the anion of the metal salt exerts a significant influence upon the structure of the aggregates by its size, charge, polarity and shape. The anion can be any anion that produces the desired pore structure. The anion can be simple inorganic monatomic elements (e.g., chloride) or complex metallo-organics such as sec-butanol. In the solvent deficient environment, complex interactions occur between the anions and the nanoparticle crystallites, which affect their stacking density, stacking orientation, spacing, etc. These intermolecular and interparticle forces direct the formation of the secondary structures. Thus, pore structure, i.e., pore diameter, pore volume, pore shape and surface area, of the product may be controlled by the choice of the anion of the metal salt used as the starting material. For example, using aluminum nitrate as a starting material can produce an alumina with a pore diameter of 3 nm, while the use of sec-butoxide may produce an alumina with a pore diameter of 18 nanometers. Surprisingly, using the solvent deficient methods, the pore diameter can be adjusted independent of the nanoparticle size. For example, alumina with a pore diameter of 18 nanometers can be achieved with particles of the same composition and size as an alumina with a 3 nm pore diameter. The ability to control the pore diameter of the metal oxide structures independent of crystallite particle size by changing the metal anion of the metal salt is a surprising and unexpected result. This result also provides evidence that the solvent deficient methods of the present invention allow control over the ordering and stacking of the crystallites rather than just sintering whatever particles happen to form as is typical in sintering methods known in the art.

The pore structure can also be controlled by dilution of the starting materials. If an organometallic salt is employed as the starting material, the addition of small amounts of a diluent (e.g., water) to the solvent deficient reaction mixture will result in substantial changes in the porous characteristics of the product. The diluent can be a liquid such as water or organic compound or liquid. The diluent is added in sufficiently low concentrations so as to not solvate the metal and base ions. Adding a diluent can have a substantial impact on the resulting pore size of the metal oxides. For example, with aluminas prepared from aluminum sec-butoxide, the pore diameter can be varied by three fold and the pore volume by four fold with the addition of small amounts of water as a diluent. In one embodiment, the diluent is water included in the precursor mixture in a molar ratio of water to alkoxides 1:1 to 1:10. The diluent may also be an alcohol, ketone, ethers or other organic liquid.

The porous structure can also be controlled by rinsing the intermediate product formed in the first step (i.e., rinsing prior to heating). The rinsing can be done with any solvent such as water or organic solvents or combinations of solvents. Rinsing can have a substantial impact on pore diameter, particularly where the anion of the metal salt is an organic anion. For example, for aluminas prepared from aluminum isopropoxide, the pore diameter can be varied by almost seven fold by rinsing the precursor with one or more organic solvents. For titanias, rinsing the precursor with one or more solvents can yield changes in pore diameter and surface area of two fold or more. $TiO_2$ prepared from TiCU and rinsed before calcination can produce pore diameters of 3-4 nm, while not rinsing can produce pore diameters of 9-12 nm or much larger.

The pore diameter can be controlled over a wide range (e.g., 3-40 nm) while maintaining a very narrow pore size distribution. Although not intending to be bound by theory, the inventors posit that in the solvent deficient environment of the nucleation and formation of the nanoparticles, the size, shape and physical properties of ions or molecules present in this partial solvation sphere or micro environment will affect the aggregation and physical stacking and orientation of the nanoparticles during their formation and the drying and/or calcining processes. These structural features are largely maintained through calcination and its attendant dehydration to form the final condensed product and are thus reflected in changes in the porous characteristics of the final product. Thus, by manipulating the micro solvation environment, the surface area, pore size, pore volume and pore shape/size distribution can be controlled to optimize the product for the specific requirements of any given application. For example, 3 nm pore sizes in alumina can be produced to support 1-2 nm noble metal crystallites in an oxidation of volatile organic compounds; or 18 nm pores can be produced for supporting 8-10 nm Co or Fe crystallites in a Fischer-Tropsch catalyst.

In some embodiments of the invention, a dopant can be added to improve and/or modify the thermal stability of the porous metal oxides and/or to stabilize certain crystal phases. For example, γ-alumina, anatase-titania or rutile-titania can be doped with small amounts (e.g., 0.1-30% or 1-10%) of other oxides, such as those of La, Ba, Si, Zr, Al, or Ti to produce porous particulate with superior thermal and/or hydrothermal performance characteristics compared to the undoped metal oxides. The present method of intrinsically doping the crystallites provides a novel, facile route to these stabilized metal oxides used as supports and adsorbents.

In one embodiment, the stabilized metal oxide is a γ-alumina. The use of a dopant to stabilize γ-alumina intermediate nanoparticles manufactured in a solvent deficient environment can yield a γ-alumina structure at much lower temperatures than γ-aluminas produced using known methods, such as techniques that convert boehmite or bayerite to γ-alumina. For example, in one embodiment a support structure of approximately 50% γ-alumina can be achieved at a calcination temperature of 350 ° C.

The present invention also relates to a method for producing crystalline anatase-titania particles at room temperature. Although numerous investigators have made anatase-titania at room temperature, the few reports in the literature which address the crystallinity, only report amorphous anatase. The anatase particles obtained from the subject method have surface areas from 100-500 $m^2/g$, pore volumes up to 0.78 $cm^3/g$, and pore diameters ranging from micropores to 44 nm.

Pore structure, structure stability, and crystal phase can be selectively and precisely controlled by using the above techniques individually or in any combination thereof. The ability to control pore structure, structure stability, and crystal phase using particular diluents, dopants, and metal salt anions is very advantageous because these reagents can be easily manipulated in the starting reagents without changing the composition of the resulting product. This allows various pore structures, structure stabilities, and crystal phases to be manufactured for porous structures having a particular composition.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION

Figure 1:
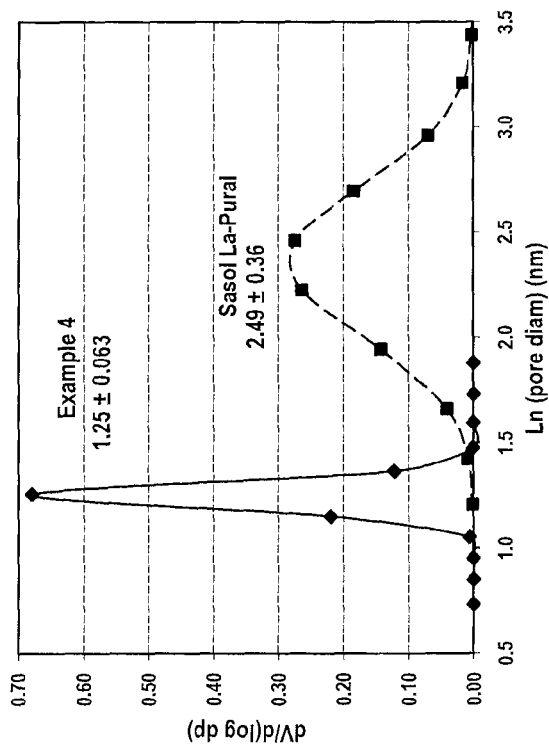
FIG. 1 is a chart showing the pore size distribution for La—$Al_2O_3$ supports manufactured according to one embodiment of the invention and treated for 2 h at 350° C.

The following descriptions and examples illustrate the preferred embodiments of the present invention in detail. Those of skill in the art will recognize that there are numerous variations and modifications of this invention that are encompassed by its scope. Accordingly, the description of the preferred embodiments should not be deemed to limit the scope of the present invention.

It is an object of some embodiments of the present invention to provide a process for producing stable nanoscale oxides of high-surface area and high mesoporosity suitable as adsorbents and catalysts supports, comprising stable mesoporous aluminas, titanias and other metal oxides, to provide a process for manipulating the porous characteristics of these metal oxides and to provide a process for making mixed metal oxides for improved thermal and hydrothermal stability.

The present invention employs the use of a solvent deficient method of making small nanoparticles with very tight size distributions to enable the production of high quality metal oxide materials for use as adsorbents, catalyst supports and other applications. The present invention produces highly connected, high surface area mesoporous metal oxide substrates, and provides a means of manipulating the secondary structure or aggregation of the nanoparticles to systematically control the surface properties and pore structure of said materials as measured by the BET surface area, pore volume, pore size and pore size distribution. The pore structure of the metal oxide products can be controlled from small mesopores to much larger pore sizes and a method of producing thermally and hydrothermally-stable metal oxide materials is enabled.

The basic method of making catalyst supports includes mixing a dry powdered (but usually hydrated) metal salt (or a mixture of metal salts to obtain mixed metal oxides) and a dry powdered base in the absence of added solvent (but optionally in the presence of diluent) to form a complex metal hydroxide/metal-oxide hydroxide precursor material and a byproduct salt. Alternatively, some starting materials such as titanium chloride are liquids at ambient temperatures and can be utilized in the same manner as the solid starting materials. The reaction is still solvent deficient and the reaction mixture consists of a solid suspension or slurry. The intermediate material, thus formed, is heated to a temperature sufficient to dehydrate the precursor to form crystalline metal oxide nanoparticles and decompose any byproducts.

In a first step, a dry hydrated salt is mixed with a base such as ammonium bicarbonate and waters of hydration are released. The subsequent rapid reaction of the partly hydrated metal cation with the base leads to a slurry of precipitated metal hydroxide or metal oxide hydroxide and a byproduct salt combining the anion of the original metal salt and the cation of the base. Upon further stirring, the slurry may thicken to a slightly-wet solid depending upon the reagents used. The entire mixing process can be carried out within 10-30 minutes to bring the reaction to completion. The first step may be modified by the addition of a small amount of a diluent such as water if there are no waters of hydration associated with the metal salt (e.g., anhydrous titanium chloride). This can be useful where water is required as a reactant or to facilitate mixing. However, a solvent deficient reaction environment is maintained in order to provide control over the formation of the pore structure. The first step produces an intermediate hydrate product that can include metal hydrates and/or metal oxide hydrates.

In a second step, the intermediate hydrate product is caused to form intermediate nanoparticles. The intermediate nanoparticles can be formed by drying. In one embodiment drying is carried out by heating at a temperature greater than 50° C., 80° C., or 100° C., less than 350° C., 200° C., or 120° C., or a range constructed from any of the foregoing temperatures.

In a third step, the intermediate nanoparticles are calcined to form a solid, stable, porous metal oxide structure with aggregated and/or sintered nanoparticles that are arranged and configured to form a desired pore structure. Calcination produces highly connected, stable sintered or condensed metal oxides (e.g. transitional aluminas). The sintered metal oxide materials may be composed of alumina, titania, zirconia, other metal oxides, mixed metal oxides and mixtures thereof. The calcination can be carried out at a temperature greater than 300° C., 350° C., or 400° C., and less than 1200° C., 800° C., 600° C., 400° C., or a range constructed from any of the foregoing temperatures. The calcination can be carried out for a period of time greater than 10 minutes 30 minutes, 1 hour, 2 hours, or 5 hours.

The second and third steps can be carried out as separate discrete steps in the same or different heating vessels or as a single step (i.e., the heating step may be a single step that transitions to calcination upon completion of the particle formation). In some embodiments, one or more components of the metal salt and/or the base may decompose to form gaseous byproducts. Alternatively, by products may be washed.

The method may also be modified by washing the precursor material prior to or after particle formation and prior to calcination to recover the byproduct salts and eliminate the gaseous decomposition of the byproducts during calcination.

The solvent deficient methods may produce unusually nano-sized crystallites (2-20 nm) which are characterized by size distributions as small as ±10%, ±20%, or ±50%. In addition, the solid state, solvent-deficient reaction conditions and gaseous byproduct removal may yield highly pure materials with uniquely clean nanoparticle surfaces with less than a single layer of adsorbed water.

The solvent deficient method can be used to prepare nano-oxides using salts of any of the transition metals, the lanthanides, the actinides, and any stoichiometric combination thereof. The intermediate nanoparticles may have controlled sizes from 2 to 20 nm and highly crystalline with well-defined shapes (e.g., typically spheres, but sometimes plates or rods). The intermediate nanoparticles may have high chemical and phase purities, and the stable polymorphic phase for a given particle size is typically produced.

Table 1 below shows a representative list of the materials that have been synthesized using the solvent deficient method. However, the present invention is not limited to the manufacture of these particular materials or their representative particle sizes (which were determined by Debye-Scherrer Line Width Analysis).

TABLE 1

| Binary Oxides | | Mixed Metal Oxides | |
| --- | --- | --- | --- |
| Sample | Size(nm) | Sample | Size(nm) |
| $Al_2O_3$ | 3 | $CoFe_2O_4$ | 8 |
| $CeO_2$ | 13 | $La_{0.03}Al_{0.97}O_4$ | 3 |
| $Co_3O_4$ | 10 | $NiAl_2O_4$ | 8 |
| $CuO$ | 8 | $NiFe_2O_4$ | 7 |
| $Fe_2O_3$ | 8 | $Mg_xAl_2O_3$ | 3 |
| $MoO_2$ | 9 | $PrCoO_2$ | 8 |
| $NiO$ | 3 | $Y_xZrO_2$ | 7 |

TABLE 1-continued

| Binary Oxides | | Mixed Metal Oxides | |
|---|---|---|---|
| Sample | Size(nm) | Sample | Size(nm) |
| $TiO_2$ | 7 | $Zn_{0.4}Co_{0.6}Fe_2O_4$ | 8 |
| $Y_2O_3$ | 13 | $ZnFe_2O_4$ | 8 |
| ZnO | 8 | | |
| $ZrO_2$ | 5 | | |

The solvent deficient method used in the present invention for preparation of highly porous, stable, nanoscale metal oxides can be customized to optimize their use as adsorbents and catalyst supports. The present method can be widely adapted to the preparation of high-surface area, highly porous binary oxides (i.e., compounds of a single metal cation with an oxygen anion) and multi-metal oxides (i.e., two or more metal ions in combination with oxygen). This method is particularly useful for preparation of mesoporous aluminas and titanias. Additional details regarding methods for making a solvent deficient precursor mixture and the reagents that can be used to make solvent deficient precursor mixtures is disclosed in Applicants co-pending U.S. patent application Ser. No. 11/707,840, filed Feb. 16, 2007, which is hereby incorporated herein by reference in its entirety.

The present invention employs interventions during and after the formation of the nanoparticles which can affect the aggregation of the nanoparticles (the secondary structure or arrangement of the nanoparticle crystallites) which are then calcined (heated to higher temperatures to cause sintering) to form stable, metal oxide structures which have high metal-oxygen connectivity. These secondary structures of the nanoparticle crystallites are largely conserved during calcination. Thus, manipulation of the ordering of the nanoparticles during aggregation, results in control of the porous characteristics of the final metal oxide products. The present invention enables the production of high surface area mesoporous metal oxide structures such as alumina and titania with unique physical characteristics.

Different metal salts will affect the nucleation, crystallization, growth and aggregation of the nanoparticles. The term "salt" is defined broadly within the scope of the present invention as a compound comprising a metal cation bonded to an inorganic (e.g., $ZrCl_4$) or organic anionic species (e.g., cerium acetate or a titanium alkoxide). In general, salts are soluble in water but some salts are only soluble at low or high pH. In the present invention, the anionic species dissociates when reacted with a base and forms either a hydrated anionic species or partially solvated anionic species, and the metal cation forms a metal hydroxide.

Examples of metal salts from four possible common metal systems which can be utilized in the present invention include, but are not limited to, (a) aluminum: aluminum acetate, aluminum acetylacetonate, aluminum ammonium sulfate dodecahydrate, aluminum bromide, aluminum tert-butoxide, aluminum sec-butoxide, aluminum pentoxide, aluminum hexoxide, aluminum chloride, aluminum chloride THF complex, aluminum ethoxide, aluminum iodide, aluminum isopropoxide, aluminum L-lactate, aluminum metaphosphate, aluminum nitrate, aluminum perchlorate, aluminum phenoxide, aluminum phosphate, aluminum phthalocyanine chloride, aluminum sulfate, aluminum tributoxide, aluminum-tri-sec-butoxide, aluminum tris(2,2,6,6-tetramethyl-3,5-heptaned-ionate), (b) titanium: titanium(iv) bis(ammonium lactato)dihydroxide solution, titanium(iv) bis (ethyl acetoacetato)diisopropoxide, titanium(iv) bromide, titanium(iv) butoxide, titanium(iv) tert-butoxide, titanium(iv) hexoxide, titanium(iii) chloride, titanium(iv) chloride, titanium(iii) chloride tetrahydrofuran complex, titanium diisopropoxide bis(acetylacetonate), titanium(iv) diisopropoxide-bis(2,2,6,6-tetramethyl-3,5-heptanedionate), titanium(iv) ethoxide, titanium(iv) 2-ethyl-1,3-hexanediolate, titanium (iv) iodide, titanium(iv) isopropoxide, titanium(iv) oxysulfate, titanium(iv) phthalocyanine dichloride, titanium(iv) propoxide, titanium(iii) sulfate, titanium(iv) (triethanolaminoato)isopropoxide, (c) Zirconium: zirconium acetate, zirconium(iv) acetate hydroxide, zirconium(iv) acetylacetonate, zirconium(iv) bis(diethyl citrate) dipropoxide, zirconium(iv) tert-butoxide, zirconium(iv) hexoxide, zirconium(iv) butoxide solution, zirconium(iv) chloride, zirconium(iv) chloride tetrahydrofuran, zirconium(iv) diisopropoxidebis(2,2,6,6-tetramethyl-3,5-heptanedionate), zirconium(iv) ethoxide, zirconium(iv) hydrogenphosphate, zirconium(iv) iodide, zirconium(iv) isopropoxide isopropanol complex, zirconium (iv) propoxide, zirconium(iv) sulfate hydrate, zirconium tetrabis(2,2,6,6-tetramethyl-3,5-heptanedionate), and (d) cerium: cerium(iii) acetate hydrate, cerium(iii) acetylacetonate hydrate, cerium(iii) bromide, cerium(iii) carbonate hydrate, cerium(iii) chloride, cerium(iii) 2-ethylhexanoate, cerium(iii) iodide, cerium(iii) nitrate hexahydrate, cerium(iii) oxalate hydrate, cerium(iii) perchlorate solution, cerium(iii) sulfate, cerium(iii) sulfate (hydrated), and cerium(iv) sulfate.

An additional aspect of the present invention is a method of improving thermal and hydrothermal stability of catalyst support materials by the use of doped or mixed metal oxide nanoparticles which are a mixture of two or more metal oxide compositions which form a homogeneous solid solution, a mixed crystalline phase metal oxide material, or one in which one of the oxide phases separates to the surface of the crystallites. These compositions are produced by mixing the salts of two or more metals in the first step of the referenced process to form a mixed metal precursor material which is calcined at approximately 350° C. or higher. It is well known by those skilled in the art that doping γ-alumina, anatase-titania or rutile-titania with small amounts (e.g., 1-10%) of other oxides, such as those of La, Ba, Si, Zr, Al, and Ti can lead to products with superior thermal and hydrothermal performance characteristics compared to the undoped metal oxides. The present method of intrinsically doping the crystallites provides a novel, facile route to these stabilized metal oxides used as supports and adsorbents.

In some embodiments, controlling the crystalline phase may be an important aspect of stabilizing metal oxide catalyst supports. An additional aspect of the present invention is a method to produce gamma crystalline phase alumina at much lower temperatures than has been reported. The γ-phase is preferred because of its much better thermal stability than the usual low temperature alumina forms, boehmite or bayerite. Utilizing the present invention, at calcination temperatures of only 350° C. approximately half of the alumina is already in the gamma phase where all previous compositions are still 100% boehmite. At modestly higher temperatures 100% γ-alumina is obtained.

Another embodiment of the present invention is a method of controlling the pore structure and pore diameter over a wide range (e.g., 3-40 nm) while maintaining a very narrow pore size distribution.

The aggregation or structural arrangement of the nanoparticles can be modified by such factors as the presence of the byproduct anion(s) from the metal salt(s) or the cation from the base. For many applications ammonium bicarbonate or similar compounds can be used. Water can be used where the metal salt is sufficiently acidic; hence, the primary source of control of the porous surface structure may be exerted by the anion of the metal salt. As mentioned above, in the solvent deficient environment during the formation and aggregation of the nanoparticles, the anion of the metal salt exerts a significant influence upon the structure of the aggregates by its size, charge, polarity and shape. The structure of possible anions is as varied as an inorganic monatomic chloride to complex metallo-organics such as sec-butanol. In this solvent deficient environment, complex interactions occur between these anions and the nanoparticle crystallites which affect their stacking density, stacking orientation, spacing, etc. These intermolecular and interparticle forces will direct the formation of the secondary structures. Thus, pore structure, i.e., pore diameter, pore volume, pore shape and surface area, of the product will are controlled by the choice of the anion of the metal salt used as the starting material.

Likewise, the addition of small amounts of reagents such as alcohols, ketones, ethers or other organic liquids to the solvent deficient environment during nanoparticle formation or aggregation can also control the porous characteristics of the final product by either interacting in conjunction with the anion(s) or acting independently to influence the secondary structure by similar mechanisms. This templating effect enables the precise control of the porous structure over a wide range (i.e., over wide ranges of surface area, pore volume and pore size).

The pore structure can also be controlled by dilution of the starting materials. If an organometallic salt is employed as the starting material, the addition of small amounts of liquids to the solvent deficient slurry will result in substantial changes in the porous characteristics of the product. (This effect is typically not observed with inorganic metal salts.) The diluent may be water, an alcohol, ketone, ether, or other liquids that are generally useful as solvents when dissolving metal salts. However, when used in the present invention, the diluent is added in concentrations that do not dissolve the metal salts in the precursor mixture. The diluent may be included in the precursor mixture in molar ratios of diluent to salt in a range from 1:0.5 to 1:15 or 1:1 to 1:10 (e.g., 1, 2, 5, or 10). For example, with aluminas prepared from aluminum sec-butoxide, the pore diameter can be varied by three fold and the pore volume by four fold with the addition of small amounts of water.

The porous structure can also be controlled by rinsing the precursor material derived from organic metal salts prior to calcination with various solvents. This effect is not observed with materials made from inorganic metal salts. For example, with aluminas prepared from aluminum isopropoxide, the pore diameter can be varied by almost seven fold by rinsing the precursor with various organic solvents. With titanias, rinsing the precursor with different solvents yielded changes in pore diameter and surface area of approximately two fold. And, in the case of hydrolysis of $TiCl_4$, variations in the order of drying, rinsing, and calcination lead to significant changes in pore diameter. (But, rinsing after calcination does not significantly affect the properties of the particles and can be done to remove unwanted byproducts such as Cl or S.) It is opined that rinsing before calcination may alter the structure of the precursor directly or, it could be that the removal of the byproduct anions (e.g., Cl or S), or other moieties may lead to the formation of a different porous network. For example, for $TiO_2$ prepared from $TiCl_4$, rinsing before calcination generally leads to pore diameters of 3-4 nm, while not rinsing leads to pore diameters of 9-12 nm or much larger.

The porous structure can also be controlled by doping the primary metal oxide with smaller amounts of one or more additional metal oxides. For example, the pore diameter of titania can be varied by the addition of small amounts of zirconium or aluminum, or the pore size of alumina decreases proportionally to increasing concentrations of added lanthanum.

An additional aspect of the present invention is a method to produce crystalline anatase-titania particles at room temperature. Although numerous investigators have made anatase-titania at room temperature, the few reports in the literature which address the crystallinity only report amorphous anatase. The anatase particles obtained from the subject method have surface areas from 100-500 $m^2/g$, pore volumes up to 0.78 $cm^3/g$, and pore diameters ranging from micropores to 44 nm.

The resulting calcined metal oxide materials are characterized by large surface areas, large pore volumes and small pore diameters typically only observed for ordered mesoporous materials prepared by substantially more complex, solvent excess methods, using templates, structure directing agents, and similar additives. However, in the present, solvent deficient method, the use of such agents is not required, although is permissible.

The porous metal oxide structures can have a controlled pore structure with a surface area in a range from 50 $m^2/g$, to 800 $m^2/g$, 200 $m^2/g$ to 600 $m^2/g$, or 250 $m^2/g$ to 500 $m^2/g$, 300 $m^2/g$ to 400 $m^2/g$. The pore structure can have a pore volume in a range from 0.05 $cm^3/g$ to 2.5 $cm^3/g$, 0.2 $cm^3/g$ to 1.8 $cm^3/g$, or 0.5 $cm^3/g$ to 1.7 $cm^3/g$. Also, the pore structure can have a pore size in a range from 2-50 nm or 3-25. The pore size can have a distribution (as determined by $4\sigma$) that is ±20%, ±50% or ±100% of the average diameter pore size. These pore structure features can be produced alone or in combination with one another. The methods of making the porous structures are highly versatile in allowing different pore structures to be created in materials that would normally have a different pore structure if made using other techniques.

The method of the invention produce, for example, mesoporous alumina materials with pore diameters as small as 3 nm with very sharp pore size distributions (±1-1.5 nm) and surface areas of approximately 350 $m^2/g$ following calcination for 2-3 hours at 350-700° C.; and pure anatase titanias with pore diameters of 6-7 nm, similarly sharp pore size distributions, and surface areas of approximately 100 $m^2/g$ without the use of structure directing and templating additives required in the prior art.

EXAMPLES

Example 1

Alumina nanoparticles were prepared by mixing solid aluminum nitrate heptahydrate and the solid base, ammonium bicarbonate ($HN_4HCO_3$) at room temperature with no additional solvent. The reaction was allowed to go to completion as indicated by the cessation of $CO_2$ evolution. The precursor material was heated at 270° C. without drying. The product was intermediate alumina nanoparticles with an average diameter of 2 nm determined by powder XRD. The nanoparticles were then calcined at 500° C. for 2 hrs to form the sintered metal oxide material with a BET surface area of 384 $m^2/g$, a pore volume of 0.42 $cm^3/g$, and a pore diameter of 3.8 nm.

Example 2

$TiO_2$ nanoparticles were prepared by mixing anhydrous $TiCl_4$ and the solid base, $NH_4HCO_3$ at room temperature with a small amount of water added to initiate the reaction (water serves as a reagent to make the hydroxide) and to facilitate mixing. The reaction was allowed to go to completion as indicated by the cessation of $CO_2$ evolution. The precursor material was heated at 400° C. without drying. The product was anatase $TiO_2$ nanoparticles with an average crystallite diameter of 9 nm determined by powder XRD and a BET surface area of 109 $m^2/g$, an average pore diameter of 7 nm, and a pore volume of 0.31 $cm^3/g$. The sample was calcined at 500° C. for 2 h to form a sintered anatase with a BET surface area of 89 $m^2/g$ and a pore volume of 0.26 $cm^3/g$.

Example 3

A mesoporous alumina was prepared by mixing the solid metal salt, aluminum nitrate ($Al(NO_3)_3$), and the solid base, ammonium bicarbonate ($NH_4HCO_3$), at room temperature with a small amount of water to facilitate mixing. The resulting intermediate precursor material was dried at 80° C. (It is stable and can be stored indefinitely). The precursor material was calcined at 350, 400, 500, 600 and 700° C. for 2 hours. The physical characteristics of the γ-alumina materials thus produced are shown in Table 2. It includes BET surface area, average pore radius, mesopore volume and the standard deviation for a log normal distribution of the pore size which were obtained by N2 adsorption at −196° C. The primary crystallite diameters obtained from XRD are shown to be 3 and 5 nm for the two calcination temperatures.

Table 2 shows the results of the mesoporous aluminas prepared by the method of Example 3. Table 2, shown below, provides surface area, average particle size, average pore radius, and mesopore volume for $Al_2O_3$ and La—$Al_2O_3$ metal oxide materials.

TABLE 2

| Sample[b] | BET SA[c] ($m^2/g$) | Mesopore vol[c] ($cm^3/g$) | Pore diam[c] log mean (nm) | Width, distribution [WD = exp(4*σ)] | XRD diam (nm) |
|---|---|---|---|---|---|
| $Al_2O_3$ 350° C. 2 h | 341 | 0.35 | 3.8 | 2.1 | 3 |
| $Al_2O_3$ 400° C. 2 h | 454 | 0.39 | 3.5 | 1.4 | |
| $Al_2O_3$ 500° C. 2 h | 384 | 0.42 | 3.8 | 1.4 | |
| $Al_2O_3$ 600° C. 2 h | 341 | 0.39 | 3.9 | 1.5 | |
| $Al_2O_3$ 700° C. 2 h | 291 | 0.39 | 4.6 | 1.6 | 5 |

Additional embodiments of the invention describe methods for making porous metal oxides from mixtures of two or more metal oxide compositions which form a homogeneous solid solution, a mixed crystalline phase metal oxide material, or one in which one of the oxide phases separates to the surface. For example, nanoparticles consisting of a mixture of two or more different metal oxides such as aluminum oxide and zirconium oxide can be made by mixing the two or more metal salts in predetermined stoichiometric amounts with a base in the absence of additional water followed by calcining at approximately 350° C. or higher or drying (e.g., 80-120° C.) and then calcining. Doping γ-alumina or anatase-titania with small amounts (1-10%) of other oxides, such as those of La, Ba, Si, Zr, Al, and Ti can lead to products with superior thermal and hydrothermal performance characteristics compared to the undoped metal oxides.

Example 4

Alumina nanoparticles were prepared by mixing solid aluminum nitrate heptahydrate, various amounts of solid lanthanum nitrate, and the solid base, $NH_4HCO_3$ at room temperature with no additional solvent. The reaction was allowed to go to completion in 15-30 min as indicated by the cessation of $CO_2$ evolution. The precursor material was heated at 270° C. without drying. The product was 3, 4, or 6 wt % La/$Al_2O_3$ nanoparticles with an average crystallite diameter of 3 nm determined by powder XRD. Samples were further calcined at 350, 400, 500, 700, 800, 900, 1000, and 1100° C. for 2 h; selected 3% La was selectively calcined at 700° C. for 5 or 10 h. BET surface area, average pore diameter, mesopore volume and the width of the pore size distribution for a log normal distribution of pore diameters obtained by $N_2$ adsorption at −196° C. are listed in Table 3.

TABLE 3

| Sample | BET SA (m²/g) | Mesopore vol (cm³/g) | Pore diam log mean (nm) | Width, distribution [WD = exp(4*σ)] | XRD diam (nm) |
|---|---|---|---|---|---|
| 3% wt La—Al$_2$O$_3$ 350° C. 2 h | 349 | 0.38 | 3.3 | 1.4 | 3 |
| 3% wt La—Al$_2$O$_3$ 400° C. 2 h | 297 | 0.28 | 3.6 | 1.3 | 3 |
| 3% wt La—Al$_2$O$_3$ 500° C. 2 h | 313 | 0.415 | 4.4 | 1.4 | 3 |
| 3% wt La—Al$_2$O$_3$ 700° C. 2 h | 280 | 0.32 | 3.7 | 1.6 | 3 |
| 3% wt La—Al$_2$O$_3$ 700° C. 5 h | 241 | 0.33 | 4.4 | 1.4 | 3 |
| 3% wt La—Al$_2$O$_3$ 700° C. 10 h | 276 | 0.385 | — | | 3 |
| 3% wt La—Al$_2$O$_3$ 800° C. 2 h | 225 | 0.29 | 4.3 | 1.7 | |
| 3% wt La—Al$_2$O$_3$ 900° C. 2 h | 187 | 0.25 | 4.5 | 1.8 | |
| 3% wt La—Al$_2$O$_3$ 1000° C. 2 h | 151 | 0.21 | 4.7 | 1.9 | |
| 3% wt La—Al$_2$O$_3$ 1100° C. 2 h | 139 | 0.22 | 5.4 | 2.0 | |
| 4% wt La—Al$_2$O$_3$ 700° C. 2 h | 269 | 0.34 | 4.3 | 1.6 | |
| 6% wt La—Al$_2$O$_3$ 700° C. 2 h | 255 | 0.355 | 4.6 | 1.7 | |

As shown in Table 3, surface area and pore volume decrease with increasing calcination temperature and calcination time, while pore diameter increases slightly with increasing calcination temperature. It is evident that the added La has stabilized and prevented grain growth of the materials when calcined at higher temperatures. The pore diameters and widths of the pore diameter distribution for La-stabilized alumina samples are both significantly smaller. However, the surface areas are slightly larger than the values obtained for pure alumina samples at the same calcination temperature (350 and 700° C.).

The properties of the metal oxides produced according to the method of Example 3 can be compared to commercially available aluminas and lanthanum-stabilized γ-alumina supports. A list of commercially available aluminas and their reported properties is provided in Table 3 below.

available sample of 3% La-Sasol-Pural-NG (see FIG. 1) and (b) 2-4 times smaller pore-size distribution widths for the aluminas and La-aluminas according to the invention relative to the corresponding commercial supports.

The porous metal oxides manufactured according to Example 3 and 4 have significantly higher surface areas than similar commercially available materials. For example, after calcination at 350° C. the surface area of the 3% La-alumina manufactured according to Example 3 is 340-350 m²/g vs. 140-200 m²/g for the 3% La-Pural as shown in Table 4. Moreover, after calcination at 700° C. the comparison is 250-280 m²/g vs. 140-170 m²/g. Since higher surface areas facilitate better catalyst dispersion, higher surface areas may be desirable.

Also, the porous metal oxides manufactured according to Examples 3 and 4 have smaller primary crystallite sizes. The

TABLE 4

| Sample | BET SA (m²/g) | Mesopore Vol (cm³/g) | Pore diam, log mean (nm) | Width, distribution [WD = exp(4*σ)] | XRD part. diam (nm) |
|---|---|---|---|---|---|
| Aluminas | | | | | |
| Catalox Sba-Al$_2$O$_3$ (Sasol) | 192 | 0.47 | 7.9 | 2.4 | — |
| Catapal B—Al$_2$O$_3$ (formerly A-Sasol) | 225-250 | 0.50 | — | | 4.5 |
| PuralNG- Al$_2$O$_3$ (Sasol) [d] | 170 | 0.45 | — | | 10 |
| Grace Alpha-Aesar 43855- Al$_2$O$_3$ | 207 | — | 9.0 | 6.8 | — |
| Grace Alpha-Aesar 43858- Al$_2$O$_3$ | 172 | 0.72 | 13.3 | 3.7 | — |
| St. Gobain | 177 | 0.74 | 14.0 | 5.6 | |
| La-stabilized aluminas | | | | | |
| Puralox SCFa-190L3, 3% La/Al$_2$O$_3$ (Sasol) calcined at 700° C. | 173 | 0.50 | 10.7 | 3.3 | — |
| Puralox SCFa-140L3, 3% La/Al$_2$O$_3$ (Sasol) calcined at 1100° C. in parentheses | 140 (80) | 0.5 | 16 | 3.3 | — |
| PuralNG- 3% La/Al$_2$O$_3$ (Sasol) calc. 700° C. | 147 | 0.47 | 11.6 | 3.2 | — |
| Catalox Sba- 3% La/Al$_2$O$_3$ (Sasol) steam-treated (P$_{H_2O}$ = 5 atm) 240 min at 700° C. | 132 | 0.46 | 11.0 | 2.4 | — |

A comparison of Tables 2-3 and 4 reveals significant quantitative differences between aluminas produced by the solvent deficient method and commercially available materials. First, the supports manufactured according to the present invention exhibit smaller pore sizes. Generally, pore diameters for the commercial aluminas are about 2-3 times larger than the aluminas and La-stabilized aluminas produced in a solvent deficient environment. Secondly, the products of the invention exhibit much tighter pore size distribution. This is dramatically illustrated by (a) the 5.7 times smaller standard deviation, σ, of the 3% La-alumna according to the invention (i.e., Cosmas-La-alumina) relative to that for a commercially alumina and La-alumina supports calcined at 350° C. have unusually small primary crystallite diameters of around 3 nm compared to 4.5 to 40 nm for Sasol Pural/Catapal boehmite aluminas. Moreover, the crystallite diameter of the La-stabilized material according to the invention remains constant (at 3 nm) during treatment at elevated temperatures and for extended times.

Example 5

A mesoporous titania was prepared by mixing anhydrous (but liquid), TiCl$_4$, and a solid base, ammonium bicarbonate (NH$_4$HCO$_3$), at room temperature with a small amount of water to initiate the reaction and facilitate mixing. The resulting intermediate precursor material was dried at 100° C. (It is stable and can be stored indefinitely). The precursor material was calcined at 400° C., 500° C., or at 700° C. for 3 hours. The physical characteristics of the titania thus produced are shown in Table 5 below, which includes BET surface area, average pore diameter, and mesopore volume which were obtained by $N_2$ adsorption at −196° C.

TABLE 5

| Sample | Calcination Temperature | Phase | SA ($m^2/g$) | Pore volume ($cm^3/g$) | Pore diameter (nm) |
|---|---|---|---|---|---|
| $TiO_2$ | 400° C. | anatase | 109 | 0.31 | 6.9 |
| $TiO_2$ | 500° C. | anatase | 88.6 | 0.26 | 7.0 |
| $TiO_2$ | 700° C. | anatase and rutile | 6.2 | 0.04 | 54 |

Example 6

Several mixed metal oxide mesoporous aluminum, zirconium, or silicon doped titanias were prepared by mixing TiCU, various concentrations of aluminum nitrate ($Al(NO_3)_3$), $SiCl_4$, or $ZrCl_4$, and ammonium bicarbonate ($NH_4HCO_3$), at room temperature with a small amount of water to initiate the reaction. The resulting intermediate precursor materials were dried at 100° C. The precursor materials were calcined at 400° C. for 3 hours. The physical characteristics of the various titania materials produced with are summarized in Tables 6 and 7. They include BET surface area, average pore diameter, and mesopore volume for log normal distributions of the pore diameters which were obtained by $N_2$ adsorption at −196° C. It is evident from data in Table 6 that surface areas and pore volumes are highest for samples containing 14 and 22% alumina. At a 5% loading, the pore diameter was the smallest at 3.4 nm.

TABLE 6

| Mol % of Al | Phase | SA ($m^2/g$) | Pore volume ($cm^3/g$) | Pore diameter (nm) | Particle diameter (nm) |
|---|---|---|---|---|---|
| 0 | anatase | 109 | 0.31 | 6.8 | 9 |
| 1% | anatase | 127 | 0.26 | 8.2 | 8 |
| 5% | anatase | 262 | 0.31 | 3.4 | 4 |
| 14% | anatase | 400 | 0.50 | 4.2 | 4 |
| 20% | anatase | 316 | 0.47 | 6.0 | 4 |
| 22% | anatase | 507 | 0.50 | 3.5 | >2 |
| 35% | anatase | 389 | 0.36 | 3.6 | |

Table 6 illustrates the surface area, average particle size, average pore diameter, and mesopore volume for 5 mol % Al, Zr, and Si—$TiO_2$ metal oxide.

TABLE 7

| Sample | phase | SA ($m^2/g$) | Pore volume ($cm^3/g$) | Pore diameter (nm) | Width-Distr 4σ (nm) |
|---|---|---|---|---|---|
| 5 mol % Al | anatase | 262 | 0.31 | 3.4 | 1.5 |
| 5 mol % Zr | anatase | 248 | 0.33 | 3.5 | 1.8 |
| 5 mol % Si | anatase | 105 | 0.19 | 4.3 | 1.8 |

Example 7

Lanthanum doped alumina was prepared as in Example 4. The lanthanum/aluminum mixed metal precursor was made and found to include a homogeneous mixture of lanthanum and aluminum compounds. The precursor was calcined at 700° C. X-ray absorption fine structure (XAFS) analysis was performed to determine if atomic migration occurs during calcination to produce an asymmetric distribution of the lanthanum and aluminum atoms in the metal oxide material. It was found that the La was not in the form of $La_2O_3$ nor $LaAlO_3$, but it was highly associated (probably bonded) with oxygen. The La-Alumina was compared to a commercially obtained alumina which had been surface treated with a lanthanum solution prior to a second calcination. The XAFS data (Table 4) show that the local environments of the La in the two samples are similar. Assuming the lanthanum is located on the surface of the commercial sample, it follows that the lanthanum of the subject material is preferentially located on or near the surface of the metal oxide crystallites. The data are consistent with amorphous, well dispersed La atoms bonded to oxygen over the entire surface of the alumina nanoparticles including at the primary particle/particle interfaces.

Hence, the inventors posit that the intimate mixing of the La and Al salts in the first stage of the process produces a uniform distribution of La throughout the nanoparticle which then migrates to the entire surface of each particle including the particle/particle interfaces during calcination at 700° C. In contrast, when La is applied in current state of the art methods by aqueous deposition and drying on the preformed sintered alumina support, it will only reach exposed particle surfaces and will be excluded from the crucial nanoparticle surfaces on the interior of aggregates which are not accessible by the deposition solution and where the aggregated particles are in contact with each other and have sintered or fused together.

Example 8

Lanthanum doped alumina was prepared as in Example 4 except that in addition to aluminum nitrate, aluminum chloride or aluminum sec-butoxide salts were used and the La concentration was varied. Mesoporous lanthanum doped aluminas were produced (Table 8). Values of surface area, pore volume, and pore diameter are exceptionally large for the 3% La-alumina prepared from the butoxide relative to the other supports.

TABLE 8

| Sample[b] | Aluminum Salt | BET SA[c] ($m^2/g$) | Mesopore vol[c] ($cm^3/g$) | Pore diam[c] log mean (nm) | Width-Distr 4σ (nm) |
|---|---|---|---|---|---|
| 3% wt La—$Al_2O_3$ | Nitrate | 280 | 0.32 | 3.7 | 1.6 |
| | Chloride | 217 | 0.34 | 5.2 | 1.8 |
| | Butoxide | 349 | 1.70 | 17.7 | 4.4 |
| 4% wt La—$Al_2O_3$ | Nitrate | 187 | 0.25 | 4.4 | 1.8 |
| 6% wt La—$Al_2O_3$ | Nitrate | 255 | 0.355 | 4.6 | 1.7 |
| | Chloride | 222 | 0.44 | 7.2 | 2.0 |

Example 9

A mesoporous alumina was prepared by mixing the solid metal salts, aluminum sulfate and lanthanum nitrate, and the solid base, ammonium bicarbonate, at room temperature with a small amount of water to facilitate mixing. The precursor material was calcined at 900° C. and 1000° C. for 2 h in order to decompose the sulfate ion byproduct. The physical characteristics of the γ-alumina aggregates thus produced are shown in Table 9. Pore diameters and distribution widths are substantially larger for the samples prepared from the sulfate relative to other salts, with the exception of the butoxide (compare Tables 8).

TABLE 9

| Sample | BET SA$^c$ (m$^2$/g) | Mesopore vol$^c$ (cm$^3$/g) | Pore diam$^c$ log mean (nm) | Width-Distr 4σ (nm) |
|---|---|---|---|---|
| 3% wt La—Al$_2$O$_3$ 900° C. | 172 | 0.60 | 12.6 | 5.8 |
| 3% wt La—Al$_2$O$_3$ 1000° C. | 147 | 0.50 | 13.4 | 6.3 |

Example 10

Mesoporous aluminas were prepared from aluminum nitrate and from aluminum chloride. The precursor material of each was divided into two aliquots. One aliquot of each was calcined wet at 700° C. and the second was calcined after it had been dried at 90° C. overnight. The drying process had no significant effect on the final products as seen in Table 10 below.

TABLE 10

| Sample$^b$ | Aluminum Source | BET SA$^c$ (m$^2$/g) | Mesopore vol$^c$ (cm$^3$/g) | Pore diam$^c$ log mean (nm) | Width-Distr 4σ (nm) |
|---|---|---|---|---|---|
| 3% wt La—Al$_2$O$_3$ 700° C. 2 h | Nitrate | 280 | 0.32 | 3.7 | 1.6 |
| 3% wt La—Al$_2$O$_3$ 700° C. 2 h(Dry) | | 279 | 0.28 | 3.7 | 1.2 |
| 3% wt La—Al$_2$O$_3$ 700° C. 2 h | Chloride | 217 | 0.34 | 5.2 | 1.8 |
| 3% wt La—Al$_2$O$_3$ 700° C. 2 h(Dry) | | 212 | 0.345 | 5.6 | 1.9 |

Another embodiment of the present invention is a method to produce crystalline anatase-titania at room temperature. The prior art methods produce amorphous anatase-titania. Obtaining a crystalline anatase at room temperature is novel because other methods which synthesize the anatase phase in aqueous solution report forming amorphous anatase which must be heat treated to induce crystallinity.

Example 11

TiO$_2$ was prepared by mixing anhydrous TiCl$_4$ and the solid base, NH$_4$HCO$_3$ at room temperature with a small amount of water added to initiate the reaction. The reaction was allowed to go to completion as indicated by the cessation of CO$_2$ evolution and the product was dried. The crystallinity of anatase TiO$_2$ product was examined using XRD. The diffraction pattern indicated that crystalline anatase was obtained.

Example 12

Figure 2:
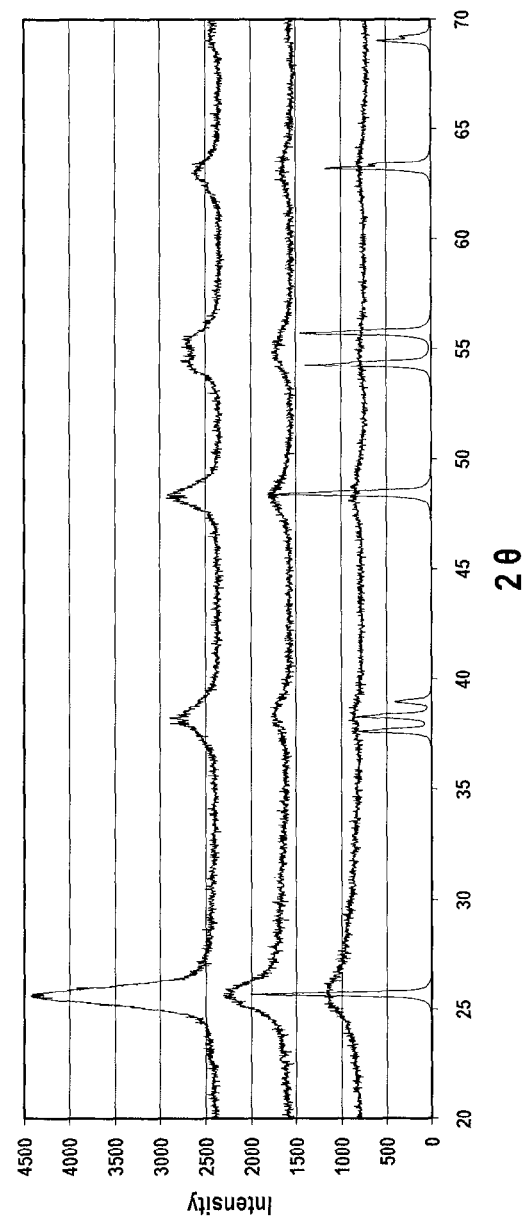
FIG. 2 shows adsorption/desorption isotherms of supports made from different aluminum salts according to one embodiment of the invention.
Figure 3:
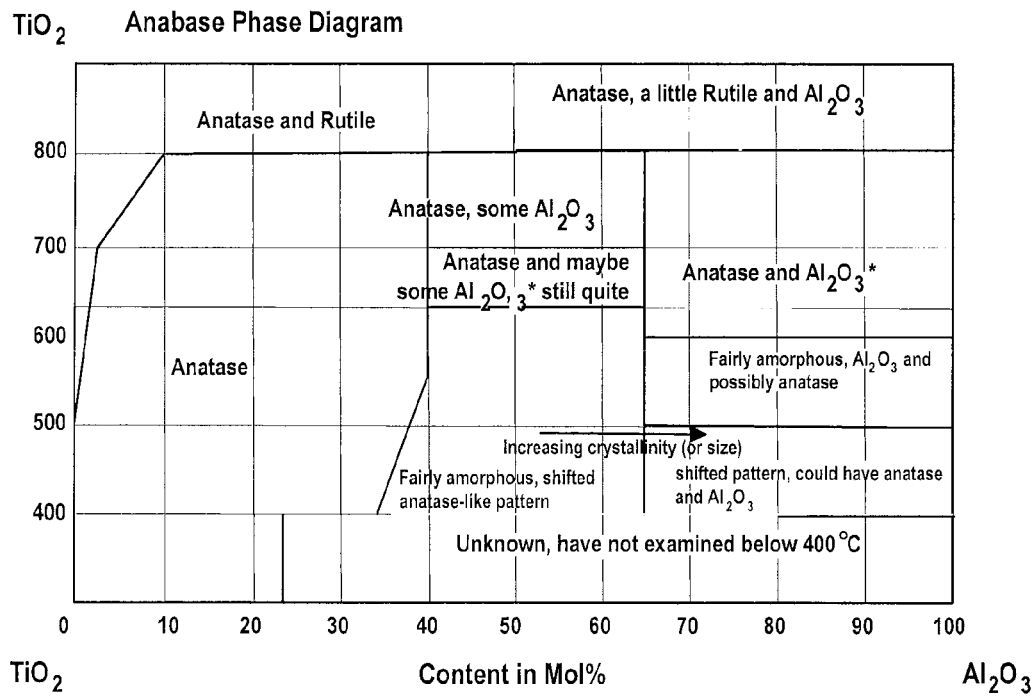
FIG. 3 is a phase diagram of anatase as calculated from anatase manufactured according to various embodiments of the invention.

Titania was prepared as in Example 11, except that 14 mol % aluminum nitrate was added to the starting materials. The crystallinity was examined using XRD. The diffraction pattern indicates crystalline anatase phase at room temperature as shown in FIG. 2. This is surprising and unexpected because the prior art reports forming an amorphous product at room temperature. After rinsing the particles were calcined at 400° C. and 700° C. XRD analysis showed crystalline anatase particles. This is surprising and unexpected because bulk phase diagrams suggest that at 400° C. and 700° C. TiO$_2$ with 14 mol % Al forms either an amorphous product or TiO$_2$ and Al$_2$O$_3$, not crystalline anatase. A nano phase diagram for particles manufactured in a solvent deficient environment according to embodiments of the present invention was generated from XRD data to show crystallinity. In one embodiment, the phase diagram may be as shown in FIG. 3.

Another embodiment of the present invention includes a method to control the pore structure and surface area of the final product. It is desirable for catalyst support materials to be available with a pore diameter and other associated structural properties optimized for a given catalyst and application. The range of structural properties of commercially available catalyst supports such as alumina, titania, zirconia, etc. are quite limited; for example in the case of alumina the range of pore size and choice of specific pore sizes is essentially limited to those shown in Table 4. Using prior art methods, has not been practical to systematically vary the porous characteristics within a given support composition and production method. The inventive methods described herein provide several alternatives for varying pore diameter, pore volume, pore morphology and surface area. Each of these characteristics are interrelated and do not operate independently, but emphasis can be placed on optimizing any one of the characteristics while changes to the other properties can be fixed within certain ranges. For purposes of describing the present embodiment, it will be assumed that the pore diameter is the characteristic of prime interest. It is, in fact, desirable to be able to control pore diameter of catalyst supports to optimize the activity and dispersion of catalysts for a particular reaction and process.

An aspect of the invention to control pore structure is a method of controlling pore size, pore volume and specific surface area through the use of the salts of a given metal with different anions. The inventors posit that as the anions of the metal salt are released, they interact in the micro solvation environment with the forming crystallites to direct the secondary structure of the nanoparticle aggregates. For example, the use of aluminum nitrate, aluminum chloride, aluminum sulfate, aluminum isopropoxide or aluminum sec-butoxide as the aluminum salt starting material yields support products with pore sizes that can be varied by four fold and surface areas which can be varied by approximately 30%. Alternatively, small amounts (solvent deficiency must be maintained)

of extrinsic solvents or agents such as alcohols, ethers, ketones, etc. can be added to the reaction mixture to modify the porous structure of the resulting product in the same manner, and in addition to the effects of the metal salt anions.

Example 13

Aluminum nitrate (21.175 g Al(NO$_3$)$_3$.9H$_2$O) and ammonium bicarbonate (13.512 g NH$_4$HCO$_3$) were mixed at room temperature for 20 minutes. The resultant precursor was calcined in air at 700° C. for 2 hours at temperature with a ramp rate of 2.33° C./min from room temperature to the calcination temperature. The experiment was repeated with equivalent molar amounts of aluminum chloride, aluminum sulfate, aluminum isopropoxide and aluminum sec-butoxide. The XRD spectra indicated that the alumina product consisted of mainly the γ-phase in all cases. The specific surface areas and the mean pore size diameter were determined by BET nitrogen adsorption using a Micromeritics Tristar 3020 apparatus. Samples were degassed at 200° C. with nitrogen flow for 20 h prior to the measurements. Specific surface areas were calculated from the corresponding nitrogen adsorption isotherms and the mean pore size diameter and pore size distribution (PSD) were calculated using a revised BJH method. The pore diameter (and standard deviation), pore volume and surface area are shown in Table 11, shown below. (Also see Example 8)

TABLE 11

| Sample | Aluminum Salt | Surf area (m$^2$/g) | Pore vol (cm$^3$/g) | Pore Diam (nm) | Width-Distr 4σ (nm) |
|---|---|---|---|---|---|
| 1 | Nitrate | 267 | 0.33 | 4.1 | 1.6 |
| 2 | Chloride | 215 | 0.39 | 7.0 | 2.3 |
| 3 | Sulfate | 172 | 0.60 | 12.7 | 5.8 |
| 4 | Isopropoxide | 338 | 1.45 | 13.9 | 1.4 |
| 5 | Sec-butoxide | 349 | 1.70 | 17.7 | 4.4 |

Figure 4:
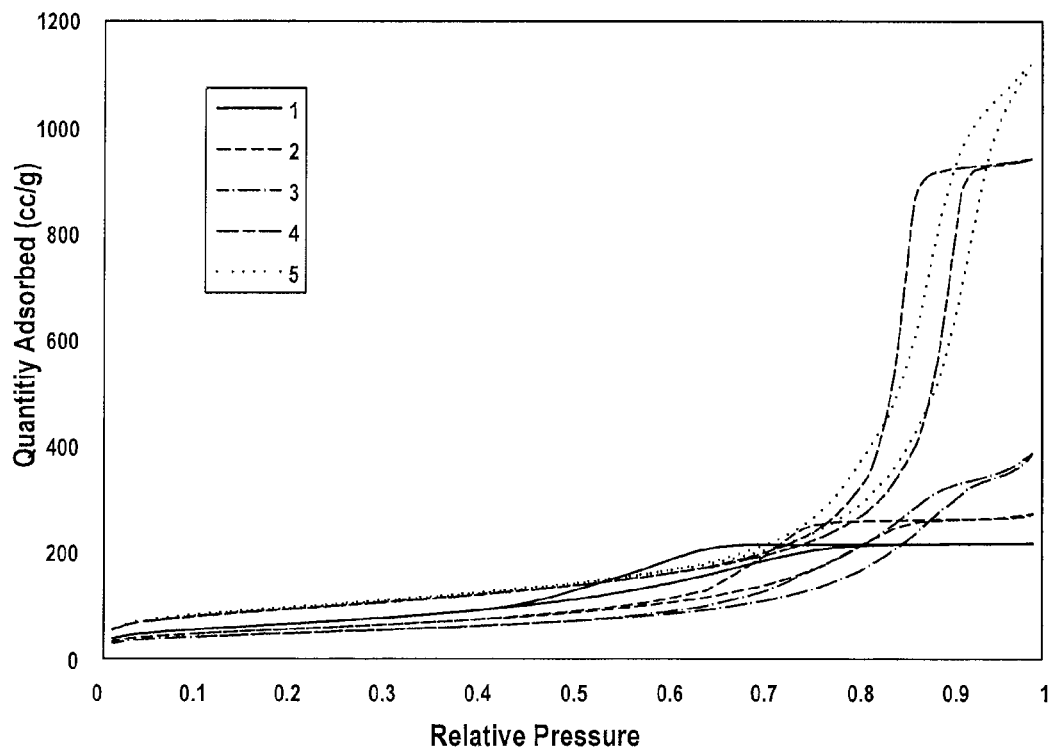
FIG. 4 shows adsorption/Desorption isotherm of supports made from different aluminum salts according to one embodiment of the invention.

As shown in FIG. 4, all the BET adsorption and desorption isotherms are of the IUPAC Type IV, which is characteristic of mesoporous materials. The hysteresis loop for Sample 4 corresponds to the H3 type, which indicates alumina supports made from alumina sec-butoxides have slit-shaped pores or plate-like particles. The hysteresis loops for the others are H1 type, which is often observed for materials with cylindrical pores with tight size distributions or spheroidal particles of fairly uniform size.

An additional aspect of the invention to control pore structure is a method of controlling pore size, pore volume and specific surface area of aluminas derived from organic aluminum salts by controlling the amount of water added to the initial solvent restricted reaction mixture. The aluminum alkoxides are sufficiently acidic that a small amount of water will serve as the base in the initial reaction of the referenced method. Traditional bases such as ammonium bicarbonate have also been used, but are not necessary to initiate the hydrolysis reaction to form the precursor and release the alcohols. The prior art reports using sol-gel methods with excess water to form aluminum hydroxides which can be processed to form porous aluminas. In conventional manufacturing methods water content is also varied but always in conjunction with templating, structure-directing agents such as aerogels, pluronic surfactants, or use of sol gel methods. The present invention employs the use of small amounts of water in molar ratios of water/aluminum in the range of 1 to 5 without needing or requiring additional templating or structure-directing agents and without the use of sol-gel methods.

Example 14

Samples of aluminum sec-butoxide were mixed with distilled water at water to Al molar ratios of 2 to 10 for 15 minutes. The precursors were calcined at 700° C. for 2 hours using a ramp rate of 2.33° C/min. The XRD spectrum indicated the alumina was γ-phase in all samples.

Figure 5:
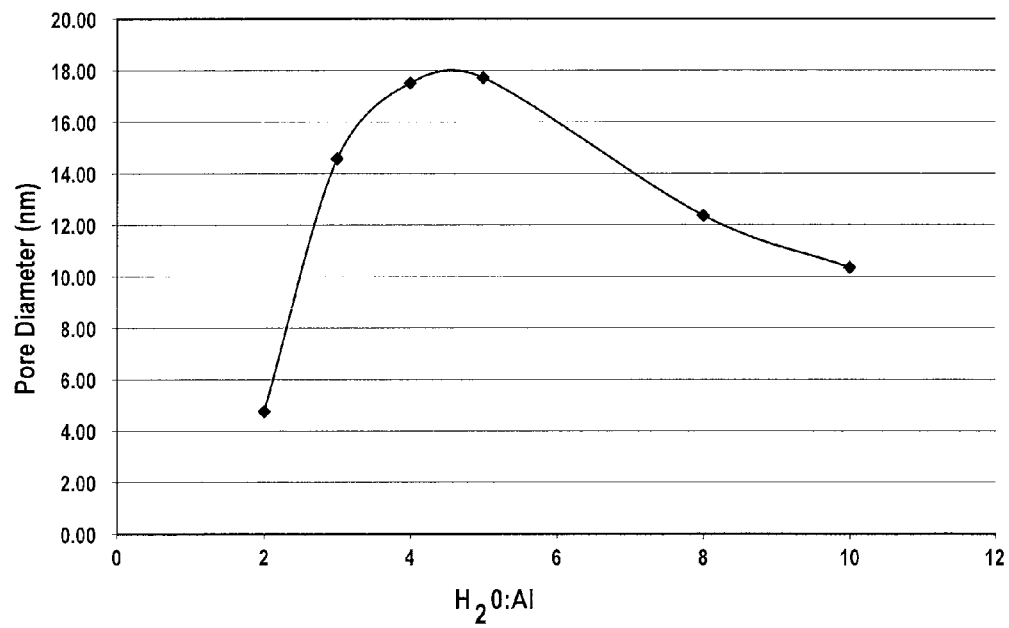
FIG. 5 is shows pore diameter as a function of the water/aluminum molar ratio in alumina synthesized from aluminum sec-butoxide and calcined at 700° C. for 2 hours.

The aluminas made with water/Al ratios from 3 to 5 yield mesoporous aluminas with extremely high surface areas and pore volumes. Pore diameters with tight size distributions are controlled over a four-fold range as shown graphically in FIG. 5.

The inventors posit that the alcohols released from the hydrolysis of the metal alkoxide direct the nanoparticle associations in a micro or partial solvation sphere or environment and the addition of small amounts of water to the alcohols in this solvent deficient environment modifies inter-particle attractions sufficiently to alter the assembly of the nanoparticles.

An additional aspect of the invention to control pore structure is a method of controlling pore size, pore volume and specific surface area of aluminas and titanias derived from organic aluminum salts or inorganic salts by rinsing the precursor with various solvents. At the precursor stage, the amorphous aluminum hydroxides and crystalline titanias are not yet fixed and their physical/structural relationships can be manipulated by the solvation environment. Hence, changes made in this solvation environment by replacing the existing materials with a different solvent or mixture of solvents will effect changes in the structural orientations of the nanoparticles as they crystallize during calcination. Solvents such as alcohols, ethers, ketones, etc. can be added to modify the porous structure of the resulting ceramic material. Thus, the porous structure of the final product can be manipulated to control the pore size, pore volume and specific surface area. The characteristic of prime importance for a given application can be optimized while changes in the two additional characteristics will be correlated.

Example 15

Figure 6:
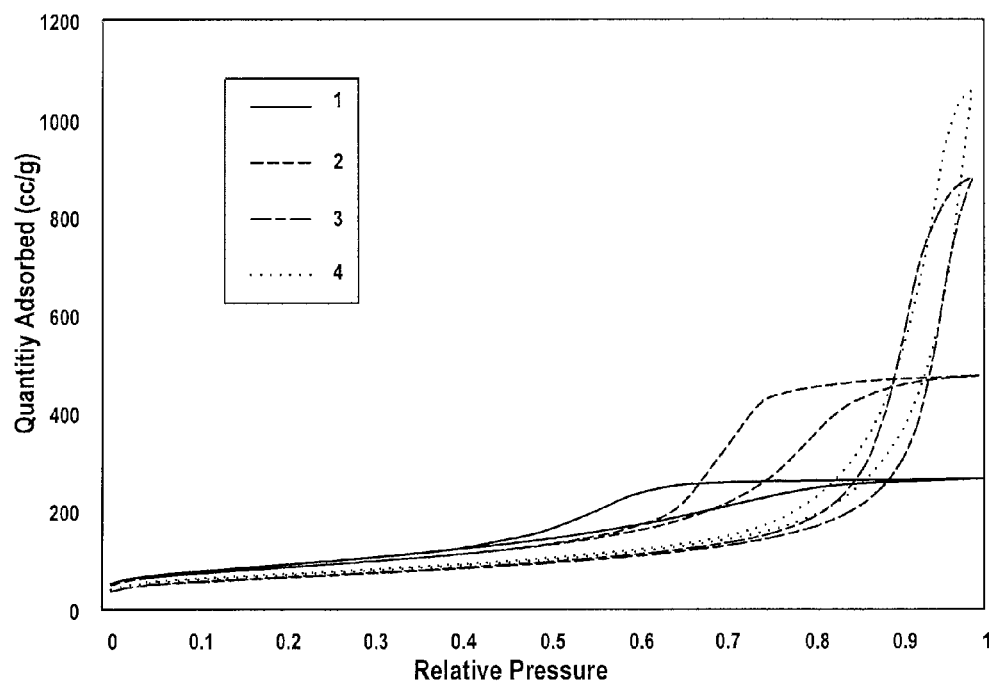
FIG. 6 shows adsorption/Desorption isotherms of samples from precursor material rinsed with different solvents.

The precursor material was prepared from aluminum isopropoxide and water at a water/Al ratio of 5. Aliquots were suspended in water and three different alcohols and collected on a Buchner funnel with vacuum. They were then calcined at 700° C. for 2 hours. The XRD spectrum indicated the alumina was completely in the γ-phase. The specific surface areas, pore volumes, pore diameters and pore size distributions were determined and are shown in Table 13 below. It can be seen that the pore volumes and pore diameters increase dramatically with washing with alcohols and are proportional to the carbon chain length of the alcohol. FIG. 6 shows the adsorption/desorption isotherms of these samples. The hysteresis type changes from H1 to H3 as the carbon number of the alcohols and pore diameters increase which confirms that the solvation environment of the precursor material as it is dried controls the structure of the final product. Thus, the porous structure can be finely controlled by manipulation of solvation with a variety of solvents and solvent mixtures.

TABLE 13

| Sample | Alcohol Used | Surface area (m$^2$/g) | Pore Vol (cm$^3$/g) | Pore Diam (nm) | Width-Distr 4σ (nm) |
|---|---|---|---|---|---|
| 11 | Water | 325.0 | 0.41 | 4.74 | 2.11 |
| 12 | Ethanol | 304.1 | 0.73 | 7.18 | 1.78 |
| 13 | Isopropanol | 229.8 | 1.31 | 23.75 | 4.12 |
| 14 | Sec-butanol | 249.0 | 1.52 | 32.89 | 9.70 |

Example 16

Precursor materials prepared from titanium chloride or titanium sulfate with and without added dopants were rinsed with ethanol, 2-propanol, or butanol and calcined at 400° C. for 3 hours. The XRD spectrum indicated the titania was in the anatase phase. The specific surface areas, pore volumes, pore diameters and pore diameter distributions were determined and are shown in Table 14. It can be seen that rinsing with alcohols leads to a decrease in surface area and an increase in pore diameter.

TABLE 14

| Rinsing agent | Starting material | Dopant % | Calcination Temp. (° C.) | SA ($m^2/g$) | Pore vol. ($cm^3/g$) | Pore diam. (nm) | Width-Distr 4σ (nm) |
|---|---|---|---|---|---|---|---|
| Water | $TiOSO_4 \cdot XH_2O$ | 0% | 400 | 140 | 0.16 | 3.5 | 1.5 |
| Ethanol | $TiOSO_4 \cdot XH_2O$ | 0% | 400 | 66 | 0.16 | 8.3 | 1.8 |
| Water | $TiCl_4$ | 22% Al | 400 | 452 | 0.43 | 3.6 | 1.5 |
| 2-propanol | $TiCl_4$ | 22% Al | 550 | 158 | 0.45 | 9.7 | 4.4 |
| Sec-butanol | $TiCl_4$ | 22% Al | 400 | 162 | 0.43 | 9.0 | 5.1 |

An additional aspect of the invention for controlling pore structure is a method of controlling pore size, pore volume and specific surface area of mesoporous metal oxide materials by doping the metal oxide nanoparticles (making mixed metal oxides) with relatively small amounts of one or more additional metal oxides. As discussed above, in some instances, the dopants tend to migrate to the surface of the nanoparticle crystallites and affect their interactions and stability. Thus, lanthanum doped alumina exhibits enhanced thermal and hydrothermal stability. The addition of such dopants also affects the pore structure of the calcined product and can, thus, be used to control or customize the porous characteristics of the product for various applications.

Example 17

Aluminum sec-butoxide and various amounts of lanthanum nitrate were mixed with distilled water at a water to Al ratio of 5 and mixed for 15 minutes. The precursors were calcined at 700° C. for 2 hours using a ramp rate of 2.33° C./min. The XRD spectrum indicated the alumina was γ-phase and the crystallite diameter was approximately 3 nm for all samples. The lanthanum concentration was varied to give from 3-12 wt % in the final mixed metal oxide product. The surface areas, pore volumes, pore sizes and pore size distributions are listed in Table 15 below. The pore diameter decreases linearly and the surface area increases with increasing concentrations of La.

TABLE 15

| Sample | Lanthanum Percentage (wt %) | Surface area ($m^2/g$) | Pore Vol ($cm^3/g$) | Pore Diam (nm) | Width-Distr 4σ (nm) |
|---|---|---|---|---|---|
| 30 | 0 | 323.6 | 1.71 | 17.9 | 3.5 |
| 31 | 3 | 332.5 | 1.72 | 17.2 | 3.4 |
| 32 | 6 | 364.6 | 1.53 | 15.8 | 5.5 |
| 33 | 9 | 367.2 | 1.40 | 14.6 | 5.9 |
| 34 | 12 | 357.0 | 1.25 | 13.7 | 6.9 |

Example 18

Titanium chloride and various amounts of aluminum nitrate were mixed with ammonium bicarbonate and a small amount of distilled water for 15 minutes. The precursors were calcined at 400° C. for 3 hours. The XRD spectrum indicated the titania was anatase. The surface areas, pore volumes, pore diameters and pore diameter distributions are listed in Table 16, below. The surface area changes approximately five fold from 0% Al to 22% Al while the changes in pore volume and pore diameter are less dramatic.

TABLE 16

| Aluminum Percentage (mol %) | SA ($m^2/g$) | Pore volume ($cm^3/g$) | Pore Diam. (nm) | Particle diam (nm) | Width-Distr 4σ (nm) |
|---|---|---|---|---|---|
| 0 | 109 | 0.31 | 6.8 | 9 | 2.1 |
| 5% | 262 | 0.31 | 3.4 | 4 | 1.5 |
| 14% | 400 | 0.50 | 4.1 | 4 | 2.1 |
| 22% | 507 | 0.50 | 3.5 | >2 | 1.5 |
| 35% | 389 | 0.362 | 3.6 | | 1.2 |

$TiCl_4$ mixed with varying amounts of $Al(NO_3)_3 \cdot 9H_2O$, ABC, and distilled $H_2O$. The initial product was then dried, rinsed with 2 L distilled $H_2O$, and calcined at 400° C.

An additional aspect of the invention for controlling pore structure is a method of controlling pore size, pore volume, and specific surface area of mesoporous metal oxide materials by rinsing the material. Rinsing the precursor or rinsing the calcined metal oxide results in changes in the BET surface parameters from the unrinsed product.

Example 19

$TiCl_4$ was mixed with Al, Si, or Zr salts, ammonium bicarbonate, and a small amount of distilled $H_2O$ in two experiments. The precursors were dried (D), rinsed with excess water (R), and calcined at 400° C. for 3 hours (C) in various orders. The XRD spectrum indicated the titania of all of the samples was in the anatase phase. The surface areas, pore volumes, pore diameters and pore diameter distributions are listed in Tables 17 and 18. An analysis of the data shows that drying the precursor has little effect, but for the Al-, and Zr-doped titanias, the pore diameters were very small and the surface areas were very large if the sample was rinsed prior to calcination and the pore diameters were large and surface areas small if the sample was rinsed after calcination. It is notable that not rinsing the Zr-doped sample produced a very large pore diameter. The surface areas of the Al and Si-doped titanias are insensitive to rinsing, but a 2.5 fold difference in pore diameters can be achieved by varying the order of the processes. Pore volumes showed some variations, but no consistent patterns. Thus, the pore diameter and surface area can be manipulated to form desired metal oxide products by rinsing the product at different stages of the process.

TABLE 17

17 Mol % of Al dopant

| Treatment | SA (m²/g) | Pore vol (cm³/g) | Pore diam (nm) | Width-Distr 4σ (nm) |
|---|---|---|---|---|
| RC | 328 | 0.26 | 3.5 | 1.5 |
| DRC | 361 | 0.42 | 3.6 | 1.5 |
| DRCR | 380 | 0.42 | 3.6 | 1.5 |
| DC | 155 | 0.43 | 9.3 | 4.4 |
| DCR | 152 | 0.35 | 9.3 | 5.8 |

TABLE 18

| Mol % of dopant | Treatment | SA (m²/g) | Pore vol (cm³/g) | Pore diam (nm) | Width-Distr 4σ (nm) |
|---|---|---|---|---|---|
| 5% Si[a] | RDC | 95.2 | 0.12 | 3.7 | 1.5 |
|  | DRC | 105 | 0.20 | 4.3 | 1.8 |
|  | DCR | 107 | 0.29 | 7.6 | 3.3 |
|  | DC | 110 | 0.35 | 8.6 | 3.3 |
|  | CR | 109 | 0.34 | 9.6 | 5.1 |
| 5% Zr[b] | DRC | 247.8 | 0.33 | 3.5 | 1.8 |
|  | DCR | 123.7 | 0.40 | 11 | 5.1 |
| 14% Zr[c] | DRC | 152 | 0.25 | 3.7 | 1.5 |
|  | DC | 88.2 | 0.49 | 44 | 9.4 | approximately 3 to 1.5 cm³/g, a five-fold range. Surface areas also vary by approximately 70%, but do not correlate with the pore diameter or volume.

TABLE 19

| Sample | Aluminum Salt | Surface area (m²/g) | Pore vol (cm³/g) | Pore Diam (nm) | Width-Distr 4σ (nm) |
|---|---|---|---|---|---|
| 1 | Nitrate | 267.2 | 0.329 | 4.1 | 1.6 |
| 2 | Chloride | 214.7 | 0.391 | 7.0 | 2.3 |
| 3 | Sec-butoxide | 294.8 | 0.817 | 10.3 | 5.1 |
| 4 | Isopropoxide | 338.4 | 1.451 | 13.9 | 1.4 |
| 5 | Sec-butoxide | 364.0 | 1.355 | 14.6 | 6.3 |
| 6 | Sec-butoxide | 349.0 | 1.698 | 17.7 | 4.4 |
| 7 | Isopropoxide | 229.8 | 1.315 | 23.8 | 4.2 |
| 8 | Isopropoxide | 249.0 | 1.521 | 32.9 | 9.8 |

Example 21

Table 20 shows a number of samples of anatase-titania generated by various combinations of methods of controlling the porous characteristics of the final mesoporous titanium oxide product. The table is arranged in increasing order of increasing pore diameter.

TABLE 20

| Sample | Starting material | Rinsing Order[a] | Calcination Temp (°C.) | Surface Area (m²/g) | Pore Volume (cm³/g) | Pore Diameter (nm) | Width-Distr 4σ(nm) |
|---|---|---|---|---|---|---|---|
| 14% Al | TiOSO₄•XH₂O | DRC | 400 | 251 | microporous | 2.2 | 2.4 |
| 14% Al | TiCl₄ | DRC | 400 | 453 | 0.49 | 3.2 | 1.8 |
| 14% Al | TiCl₄ | DR |  | 260 | 0.53 | 5.8 | 2.9 |
| 14% Si | TiCl₄ | DRC | 400 | 293 | 0.47 | 6.6 | 7.4 |
| 5% Si | TiCl₄ | DC | 400 | 110 | 0.35 | 8.6 | 3.3 |
| 14% Al | TiCl₄ | DC | 400 | 155 | 0.43 | 9.3 | 4.4 |
| 5% Al | TiCl₄ | DCR | 400 | 148 | 0.43 | 10 | 3.8 |
| 5% Zr | TiCl₄ | DCR | 400 | 124 | 0.40 | 11 | 5.1 |
| 14% Al | TiCl₄ | C | 700 | 126 | 0.41 | 11 | 1.8 |
| TiO₂ | TiOSO₄•XH₂O | DC | 600 | 112 | 0.44 | 14 | 3.3 |
| 14% Zr | TiCl₄ | DC | 700 | 65 | 0.41 | 38 | 5.8 |
| 14% Zr | TiCl₄ | DC | 400 |  | 0.49 | 44 | 9.4 |

An additional aspect of the invention for control of the pore structure is a method of controlling pore size, pore volume and specific surface area of mesoporous metal oxide materials by using various anions of the metal salts, various water to metal ratios with organic metal salts, washing the precursors made from organic metal salts with various solvents or doping with one or more additional metals in various combinations. By selecting an individual method or by combining two or more methods, the porous characteristics of a given metal oxide can be controlled within close tolerances to customize the given mesoporous metal oxide material for a number of different applications.

Example 20

Table 19 below shows a number of samples generated by various combinations of methods of controlling the porous characteristics of the final mesoporous aluminum oxide product. The table is arranged in increasing order of pore diameter. The pore diameters are relatively evenly spaced from approximately 4 to 33 nm, an eight-fold range. The pore volumes also correlate closely with the pore diameters from In Table 20, "D", "R", and "C" stand for dried (D), rinsed (R), and calcined (C), which were performed in varying order as indicated in the third column.

An additional embodiment of the present invention is a method of stabilizing high surface area rutile phase titania. It is known that the hydrolysis of TiCl₄ in an acidic environment leads to rutile nanoparticles. These particles are stable to approx 100-200° C., and at higher temperatures they transform to anatase. We modified rutile particles by incorporating one or more of the dopants, La and Al, into the rutile in the beginning mixing stage. Adding up to 14 mol % of Al and 5 mol % of La resulted in XRD patterns that matched the pure rutile phase pattern at room temp. The particles were calcined at 400° C. and the Al and La modified rutile remained rutile phase, demonstrating that the dopants stabilized the particles. The Al doped products remained rutile to at least 700° C.

Example 22

TiCl₄ and aluminum nitrate were used to make 14 mol % Al doped product and water was added at room temperature in a 1:40 (Ti+dopants:water) molar ratio. The mixture was dried at 100° C. The product was found by XRD to be rutile. To control pore diameter, remove unwanted byproducts (such as Cl), to increase crystallinity, and to establish thermal stability, the initial product was rinsed with approximately 2 L of $H_2O$ on a Buchner funnel and split into two portions which were calcined at 400° C. and 700° C. respectively for 3 hours. After calcination, both samples were found by XRD to be rutile. These results demonstrate that doping with Al stabilized the rutile phase to at least 700° C., much higher than the limits established in the prior art. After calcining at 400° C. the BET surface area is 89.9 $m^2/g$ which is approximately twice the surface area of the undoped sample and the undoped sample is transitioning to anatase, which is indicated in Table 21 below.

TABLE 21

| Sample | Calcination Temperature | phase | Surface Area ($m^2/g$) | Pore volume* ($cm^3/g$) | Pore diameter* (nm) |
|---|---|---|---|---|---|
| undoped | 400° C. | Rutile/anatase | 45.3 | 0.085 | 4.0, micropores |
| 14% Al | 400° C. | Rutile | 89.9 | 0.11 | 3.5 |

*volume of micropores not measured

Example 23

$TiCl_4$ was mixed with enough lanthanum nitrate or aluminum nitrate to make a 5 mol % La or Al doped product and then water was added at room temperature in a 1:40 (Ti+dopants:water) molar ratio. The mixture was dried at 100° C. and the product was found by XRD to be rutile phase (FIG. 12). The product was rinsed with approximately 2 L of $H_2O$ in a Buchner funnel and calcined at 400° C. for 3 hours. The sample was found by XRD to be rutile. These results demonstrate that doping with lanthanum or aluminum stabilizes the rutile phase. By 400° C. the undoped sample is a mixture of antase and rutile while the doped samples remain rutile phase, demonstrating that the rutile phase has been stabilized.

It is believed that the unique pore structures formed by making the metal oxides according to the present invention are the result of one or more of the following unique characteristics. The complex metal hydroxide/metal-oxide hydroxide precursor materials formed during the water-deficient conditions are more "condensed" and "connected" than those formed by current state of the art techniques carried out in aqueous rich precipitation methods. Thus, the pore structures of the intermediates of the present invention are similar to those of the product, which means that drying and low-temperature calcination have less of an effect upon the textural properties of the product, as compared to prior art techniques.

In addition, in some embodiments the intermediate products contain oxide structures normally observed only after calcination at higher temperatures, e.g., in the case of alumina roughly 50% boehmite and 50% gamma are found in the material calcined at only 350° C. compared to state of the art methods which are 100% boehmite at these temperatures.

Finally, drying and/or calcining rates during have little or no effect on the textural properties (i.e. surface area, pore volume, and pore diameter) of the oxide product due to the condensed and connected structure of the intermediate products. This observation for the methods of the present invention is surprising and unexpended because it is highly contrary to observations reported in scientific and patent literature for other types of methods. For example, the current state of the art is that the drying rate greatly influences pore structure and surface area [Liu et al, 2008; Marquez-Alvarez et al., 2008]. Drying of the hydroxide or pseudoboehmite is generally conducted stepwise at 25-150° C. [Liu et al, 2008; Vaudry et al, 1996]. Low-temperature calcinations are also conducted at low heating rates, e.g., 0.5-1.0° C./min [Liu et al, 2008; Vaudry et al, 1996; Marquez-Alvarez et al, 2008] because in the typical synthesis of alumina "Al—O—Al connectivity is not yet fully developed and further condensation of Al—O—Al bonds proceeds during the early stages of the calcination process. This is in contrast to the synthesis of mesoporous silicates, where the condensation is practically finished during the synthesis" [Marquez-Alvarez et al, 2008]. The data for the subject method, however, show by contrast that most of the condensation occurs in the solvent-deficient mixing process.

The oxide products formed in the process of the invention are highly porous and have higher surface areas and smaller, more tightly distributed pores than those in conventional commercial aluminas. Moreover, the textural properties of the alumina products are comparable to those obtained for organized mesoporous aluminas obtained by complex methods of synthesis using templates during the sol-gel stage [Marquez-Alvarez et al, 2008]. The high surface areas, small, regular pores, and high thermal stabilities of the aluminas of the invention are novel compared to those obtained by state of the art templating methods. For example, the products are made of particles with unique micro architecture as evidenced by the unique ways in which the particles assemble themselves during sintering. This result is further surprising, given that textural properties of templated aluminas prepared in aqueous rich solution "are usually of lower quality compared with alcoholic solutions" [Marquez-Alvarez et al., 2008]; nevertheless, the textural properties for aluminas prepared by the methods of the invention in a water deficient environment are of comparable high quality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a highly porous, stable metal oxide alumina catalyst support consisting essentially of:
    mixing aluminum phenoxide or at least one metal salt of an aluminum alkoxide with water as the only base reactant;
    to form a solvent deficient precursor mixture
    allowing the aluminum phenoxide or at least one metal salt of an of aluminum alkoxide and the water to react in the solvent deficient precursor-to form intermediate nanoparticles; and
    calcining the intermediate nanoparticles to yield a stable metal oxide having a pore structure;
    wherein the anion of the metal salt is chosen to control the pore structure of the stable metal oxide and the pore diameter of the porous metal oxide is controlled to a range of from about 2-50 nm.

2. A method according to claim 1 wherein the alkoxide is from the group consisting of ethoxide, isopropoxide, pentoxide, sec-butoxide, tert-butoxide, tributoxide, tri-sec-butoxide, an hexoxide, and combinations thereof.

3. A method according to claim 2 wherein the alkoxide is isopropoxide.

4. The method of claim 1 wherein the molar ratio of water to Al is from about 2-10.

5. A method according to claim 1 wherein the intermediate nanoparticles are rinsed with water or an organic solvent prior to calcining.

6. A method according to claim 5 wherein the intermediate nanoparticles are rinsed with an alcohol prior to calcining.

7. A method according to claim 1 wherein a different metal salt is included in the reaction mixture as a dopant to increase the thermal stability of the resulting metal oxide.

8. A method according to claim 7 wherein the different metal salt is a titanium salt present in an amount to provide 1-30% by weight of titania in the final metal oxide product.

\* \* \* \* \*